April 3, 1956 R. E. GRAHAM 2,740,912
TELEVISION PICK-UP TUBE
Original Filed Dec. 30, 1949 2 Sheets-Sheet 1

INVENTOR
R. E. GRAHAM
BY Hugh S. Wertz
ATTORNEY

TELEVISION PICK-UP TUBE

Original Filed Dec. 30, 1949 2 Sheets-Sheet 2

INVENTOR
R. E. GRAHAM
BY
Hugh S. Wertz
ATTORNEY

United States Patent Office 2,740,912
Patented Apr. 3, 1956

2,740,912

TELEVISION PICK-UP TUBE

Robert E. Graham, Morristown, N. J., assignor to Bell Telephone Laboratories, Incorporated, New York, N. Y., a corporation of New York Original application December 30, 1949, Serial No. 136,107, now Patent No. 2,629,011, dated February 17, 1953. Divided and this application September 19, 1950, Serial No. 185,635

4 Claims. (Cl. 313—68)

This invention relates to the translation, transmission, reception, and reproduction of electric communication signals, particularly television image signals and the like. This application is a division of application Serial No. 136,107, filed December 30, 1949 by the present inventor, and which matured into U. S. Letters Patent 2,629,011 on February 17, 1953.

It is the principal object of the invention to provide a television camera tube which can generate signals representative of the coarse and fine detail components, respectively, of a pictorial subject.

In a copending application of the present inventor, Serial No. 136,105, filed December 30, 1949, and which matured into U. S. Letters Patent 2,629,010 on February 17, 1953, there is disclosed a system for the reduction of the transmission band width of television image signals in which the reduction is achieved by discarding a major portion of the fine detail video information. In accordance with another invention of the present inventor, disclosed in the aforementioned application Serial No. 136,107, of which this is a divisional application, a further reduction in transmission band width is achieved by the systematic non-utilization of a portion of the available coarse video information. This is done by reducing the number of scanning lines per frame in the coarse image dissector of a dual camera tube arrangement similar to that described in the aforementioned application, Serial No. 136,105. This procedure requires an additional storage operation at the receiving point in order to alter the coarse signal to the proper number of lines. The additional saving in band width afforded by this second invention is obviously in a different direction from that of the band width reduction scheme disclosed in the copending application Serial No. 136,105.

The present invention provides image dissector tubes which can operate according to the requirements of the copending applications. These image dissector tubes have dual apertures, one larger than the other. The wide aperture yields a coarse signal, and a differential combination of the outputs of the two apertures yields a fine detail signal.

The invention will be more fully understood by referring to the following detailed description taken in connection with the accompanying drawings forming a part thereof, in which.

Figure 1:
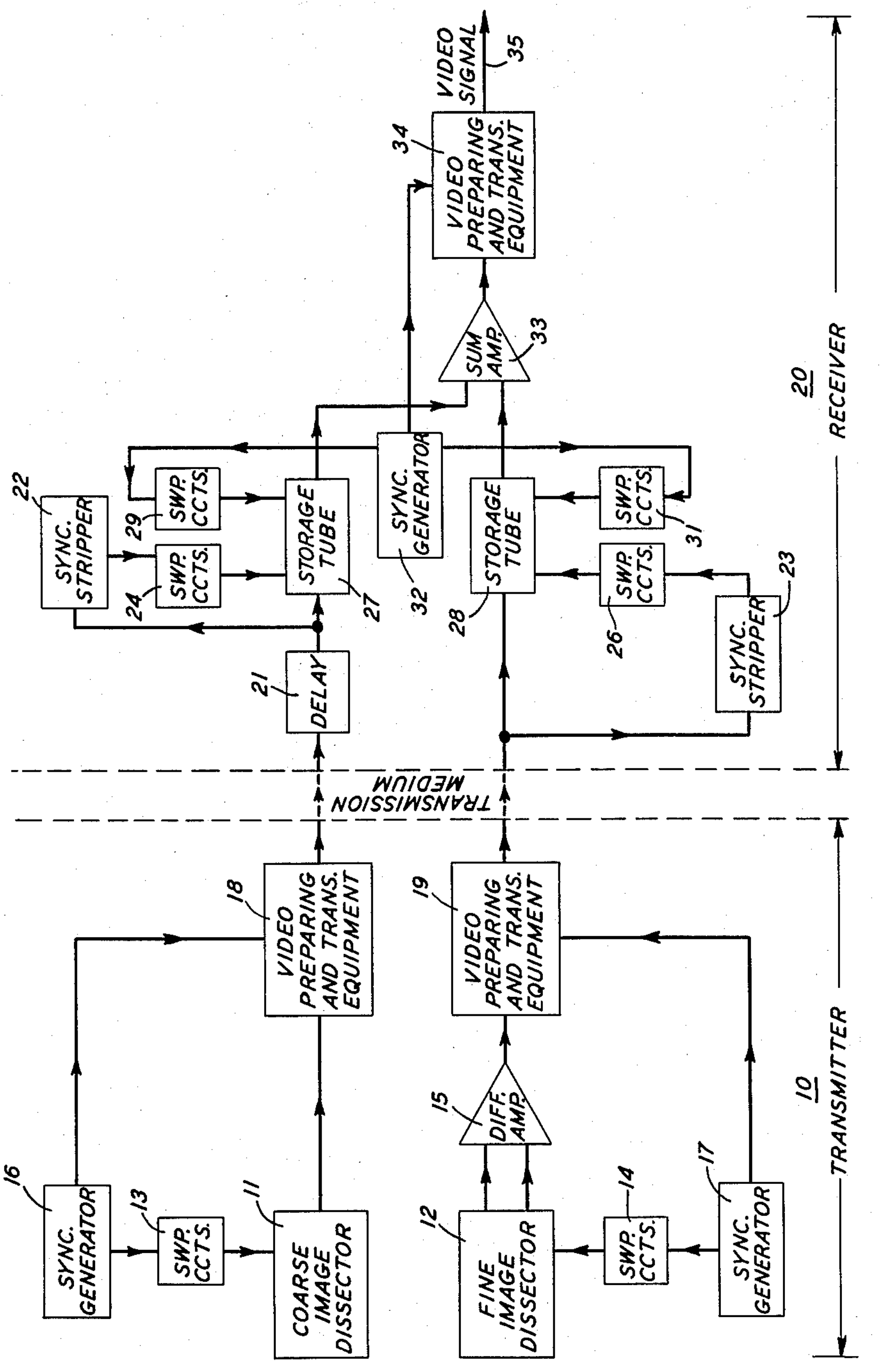
Fig. 1 is an overall block diagram of an exemplary arrangement of a reduced band width television system.

In accordance with the arrangement shown in Fig. 1, the television image is separated at the transmitting end into coarse and fine fields or signals by the use of special scanning apertures (in camera tubes 11 and 12), which are discussed more fully below in connection with Figs. 2 and 3. By this means, the coarse-fine separation can be effected in all directions equally, rather than solely along the scanning direction, which is the situation when electrical filters are used as separating media in accordance with one aspect of the aforementioned application, Serial No. 136,105. Since the vertical height of the coarse scanning aperture (in camera tube 11, the coarse image dissector) may be many times the conventional scanning-line pitch, it is possible to use a coarser scanning line structure, i. e., fewer total lines in the coarse dissector tube raster, without deterioration of the quality of the image. It is this reduction in the number of scanning lines which, as mentioned above, effects a further frequency band economy.

At the transmitting end 10, sweep circuit 13 for the coarse image dissector 11 is controlled by a local synchronization generator 16, in accordance with usual electronic techniques. Similarly, sweep circuit 14 for the fine image dissector 12 is controlled by a local synchronization generator 17. The scan for the coarse dissector is at a normal frame rate of $n$ frames per second (preferably interlaced, according to Radio Manufacturers Association standards), but at a reduced scanning line rate of $N_1$ lines per frame. The sweep rates for the fine image dissector are $n_1$ frames per second ($n_1$ being less than $n$, as in the similar arrangement in the copending application, Serial No. 136,105), and a normal number N lines per frame ($N_1$ being less than N). The required synchronization and blanking signals, which are generated in accordance with standard television practice, are mixed with the coarse and fine signals before transmission. The circuits in which these operations occur have been subsumed, for convenience and simplicity of exposition, under the designation "video preparing and transmitting equipment" and are so identified as elements 18 and 19 of Fig. 1. The circuits of element 18 operate on the coarse signal from the coarse dissector and the circuits of element 19 on the fine signal from the fine dissector and the differential amplifier 15 (the function of which in forming the fine signal is discussed more fully below).

At the receiving end 20 of the system, the coarse signal passes through a delaying means 21 where it is delayed by about $$\frac{1}{2n_1}$$

seconds to match the average time delay in the fine signal due to its lower frame repetition rate. (That this is the proper amount of delay is readily demonstrable.) Then both coarse and fine signals are stored at sweep rates controlled by their self-contained synchronization signals. A synchronization signal stripper circuit 22, of a type well known in the electronic art, strips the synchronizing signals from the coarse signal and these synchronizing signals control a sweep circuit 24, which thus causes the recording beam of a storage tube 27 to sweep at the coarse signal rate of $n$ frames per second and $N_1$ lines per frame. Similarly, synchronization signal stripper circuit 23 controls a sweep circuit 26 which causes the recording beam of a storage tube 28 to sweep at the fine signal rate of $n_1$ frames per second of N lines per frame.

A local synchronizing signal generator 32, which operates in accordance with ordinary television practice, controls sweep circuits 29 and 31, which cause identical sweep rates of the pick-up beams of both the fine signal storage tube 28 and the coarse signal storage tube 27. This rate is the normal television rate, hereinabove designated as $n$ frames per second and N lines per frame. This synchronization generator 32 is, in the figure, shown as being free-running, but it is obviously equally within the ambit of the invention for it to be locked at $n$ frames per second by the synchronizing components contained in the received coarse signal. The coarse and fine signals are now both on an $n$ frames per second, N lines per frame basis, and these component signals are added together in an ordinary summation amplifier 33 and mixed, in a circuit 34 in accordance with well known electronic techniques, with a standard synchronizing wave-form from the receiver synchronization generator 32. The output video signal 35 thus obtained is a conventional video signal except when there is motion or change in the pictorial subject matter. The difficulties introduced by such motion are substantially avoided by the automatic gain control arrangement described in connection with Fig. 5 of the above-identified copending application, Serial No. 136,105 or alternatively, by the motional correlation system set forth in another copending application, Serial No. 136,106, filed December 30, 1949 and which matured into U. S. Letters Patent 2,652,449 on September 15, 1953.

The advantages of the above-described system will be apparent from a closer examination of certain characteristics thereof. The permitted increase in horizontal blurring of the coarse field can conveniently be designated as $$\frac{1}{k}$$

It is then readily demonstrable that, if N is the conventional number of scanning lines per frame and $N_1$ is the number of lines per frame for the coarse signal, the required band width for the coarse signal is:

$$\text{Coarse band}=\left(0 \text{ to } k\frac{N_1}{N}f_m\right)$$

where $f_m$ is the maximum video frequency normally transmitted by the system. It can also be readily shown that the fine signal frequency range is given by:

$$\text{Fine band}=\left(k\frac{n_1}{n}f_m \text{ to } \frac{n_1}{n}f_m\right)$$

where $n$ is the normal frame repetition rate and $n_1$ is the reduced repetition frame rate characteristic of this invention and that of the copending application, Serial No. 136,105, filed December 30, 1949.

Although great band width economy can be achieved by making the reduced number of scanning lines $N_1$ very small, such a technique introduces the danger of too coarse a scanning structure, with the consequence that the image will be intolerably degraded. Thus, it has been found convenient to allow roughly twice as much vertical overlap of the coarse scanning aperture as in the conventional television system. This approximate relationship is represented by $$\frac{N_1}{N}=2k$$

This is obviously a reasonable requirement when $k$ is very much smaller than unity, i. e., when the new scanning structure is much coarser than the conventional structure, which is the situation here.

An examination of the above relationships with respect to some exemplary values which may be considered to be typical of preferred practice will be valuable. For purposes of illustration, therefore, it is assumed that $$k=0.1, \frac{n_1}{n}=0.1$$

and the maximum video frequency $f_m=4$ megacycles per second. It is then readily seen that, fixing $$\frac{N_1}{N}=0.2$$

the required frequency bands become:

Coarse band=0 to 80 kilocycles per second, and
Fine band=40 to 400 kilocycles per second.

The total required frequency band is thus approximately 400 kilocycles, which for the illustrative values chosen is, as readily as can be shown, a two-to-one economy as compared with the basic band width reduction system disclosed in the aforementioned application, Serial No. 136,105, filed December 30, 1949 and approximately a ten-to-one saving in band width as compared with the conventional television transmission systems now in common use.

It is to be noted that the coarse signal now corresponds (referring to the exemplary values chosen above) to a picture field having about 50 picture elements horizontally and 100 vertically. That is, in addition to the original responsibility for horizontal sharpness as in the aforementioned application, Serial No. 136,105, filed December 30, 1949 much of the burden of vertical sharpness has been shifted to the slowly-repeated fine signal, whose required band width is scarcely affected thereby.

It is evident that it may also be advantageous to use the saving resulting from the coarsening of the scanning line structure to improve the horizontal resolution of the coarse field, while maintaining the same band width as required in accordance with the techniques and using the apparatus disclosed in the aforementioned application, Serial No. 136,105, filed December 30, 1949. In order to illustrate this aspect, $k$ can conveniently be set at $$0.25 \text{ and } \frac{N_1}{N} \text{ at } 0.4$$

with the other exemplary values the same as those set forth in the discussion of the example of practice described above. These illustrative values yield only a 1.6 to 1 increase in vertical overlap, but this is sufficient since the coarsening of the scanning line structure is only 2.5 times in this case. In this illustrative example, the required frequency bands are:

Coarse band=0 to 400 kilocycles per second,
Fine band=100 to 400 kilocycles per second, which, it can readily be shown, is closely approximate to the frequency band requirements of the basic system outlined in the aforementioned application Serial No. 136,105, assuming the same illustrative values. The resulting coarse signal in this example of practice corresponds, however, to a picture field containing 125 picture elements horizontally and 200 vertically. During those times when there is appreciable motion in the televised scene and the coarse field must bear the brunt of the imagery, this 125 by 200 element arrangement is a more satisfactory one than the 50 by 500 element field characteristic of the system of the aforementioned application, Serial No. 136,105. (It should be noted that a conventional picture field, i. e., one transmitted in accordance with present standard American television practice, 525 lines per field and 4 megacycles per second, has been assumed, for clarity of exposition, to be approximately a 500 by 500 element field.)

Figure 2:
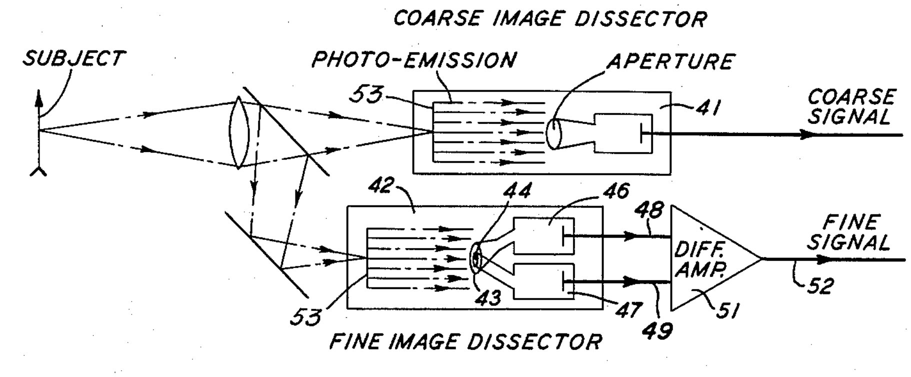
Fig. 2 shows an illustrative image dissector tube arrangement which can be used to separate from each other the coarse and fine detail components of the video information.

In accordance with the invention, the separation of the coarse and fine components can be effected by the use of the exemplary arrangement shown in Fig. 2. In that figure, the coarse image dissector 41 is a well-known type of dissector tube, such as, for example, the Philo T. Farnsworth image dissector. (See, e. g., Zworykin and Morton, Television (1940), page 230 et seq.) But in the fine image dissector 42, one aperture 43 is made large, of a size corresponding to that in the coarse dissector, while the other one 44 is made much smaller, i. e., approximately the conventional size, and these apertures 43 and 44 are concentric. The electrons, moving from the photocathode 53 and passing through the two apertures, are amplified by separate electron multipliers 46 (large aperture) and 47 (small aperture) to yield usable signal outputs 48 and 49, respectively. The relative multiplier gains are so adjusted that the two output signals 48 and 49 are equal when a uniform density of electrons impinges upon both apertures. These two signals are then fed to a differential amplifier 51 which yields an output 52 proportional to the difference between the two signals 48 and 49, being zero when the two signals are equal. In this arrangement, the two aperture signals substantially cancel each other for very gradual (i. e., "coarse") changes in picture brightness, irrespective of the direction in the picture along which the changes are taking place. For the more "sharp" changes in picture brightness, however, the two apertures respond differently, the fine aperture 44 faithfully following the detail and the coarse aperture 43 following only the average trend. Thus, the output of the differential aperture is zero for long-pitch variations in brightness and is a proportional representation for short-pitch variations in brightness (within, of course, the resolution capability of the fine aperture). It is evident that the action of the two apertures 43 and 44 and the differential amplifier 51 is analogous to that of a high-pass electrical filter.

Figure 3:
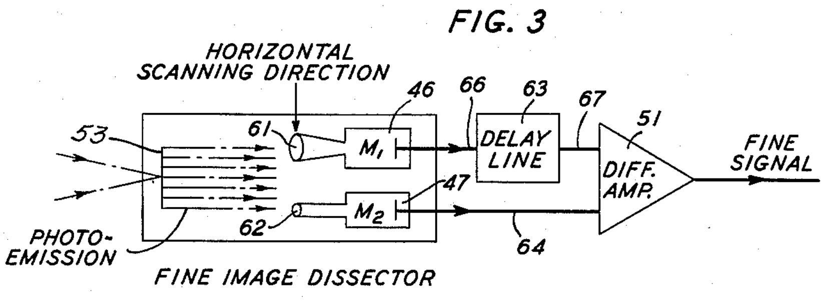
Fig. 3 illustrates another exemplary embodiment of the fine component image dissector tube, also in accordance with the invention.

In the fine image dissector shown in Fig. 3, which is another exemplary embodiment of the invention, the two apertures 61 and 62 are not in fact concentric, but they are disposed along a scanning line so that one aperture center traverses any given vertical contour of the picture (electron image) a time T ahead of the other aperture center. In the arrangement as drawn, the output 66 from electron multiplier 46 (which operates on the signals coming through wide aperture 61, the first aperture in time) is delayed by an amount T in a delaying means 63, in accordance with techniques well known in the art. The delayed output 67 and the output 64 from an electron multiplier 47 of narrow (and second in time) aperture 62 are fed to the differential amplifier 51, just as in the arrangement of Fig. 2. The behavior of the illustrative arrangement of the fine dissector of Fig. 3 is the same as though the two apertures 61 and 62 were actually concentric, since these apertures are made to appear so by the use of the delay line 63.

Figure 4:
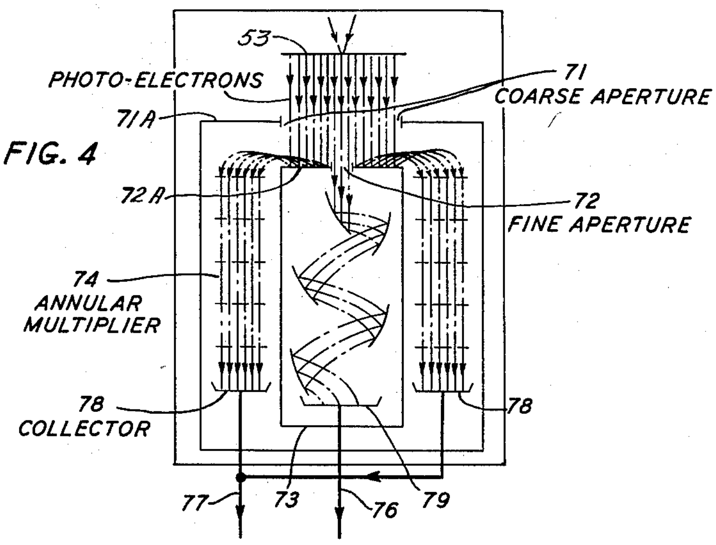
Fig. 4 shows still another illustrative arrangement of image dissector tube which is in accordance with the practice of the invention.

Still another illustrative arrangement for the separation of the coarse and fine detail in accordance with the invention is shown in Fig. 4. A beam of electrons is emitted from the photocathode 53 and passes through aperture 71 in the planar member 71A and aperture 72 in the planar member 72A. In this arrangement, the apertures are actually coaxial and the members 71A and 72A located in different planes may be parallel. The signal 76 is simply the ouput from a collector 79 in a conventional multiplier 73, while the signal 77 is the output of a collector 78 in an annular multiplier 74, of a type which is well known in the electronic art and which can, for example, be of the general type used in the RCA Image Orthicon camera tube.

It is to be understood that the above-described arrangements are illustrative of the application of the principles of the invention. Numerous other arrangements may be devised by those skilled in the art without departing from the spirit and scope of the invention.

What is claimed is:

1. A cathode ray television transmitter device for simultaneously generating a plurality of distinct video signals comprising means for forming an electron beam, means comprising a first substantially planar member having an aperture therein for passing at least a portion of said beam, means comprising a second substantially planar member having an aperture smaller than the aperture of said first planar member for passing a portion of the beam passed by said first member and for deflecting the remainder, the aperture of said second planar member being coaxially positioned with respect to the aperture of said first planar member, first means separated from said planar members for collecting and utilizing the deflected electrons to obtain a first video signal, and second means separated from said planar members and said first means for collecting and utilizing the electrons in that portion of the beam which was passed by the aperture of said second planar member to obtain a second video signal simultaneously with said first signal.

2. A cathode ray television transmitter device according to claim 1 wherein the second planar member is parallel to the first planar member and is located in the device at a position more remote from the beam forming means than the first planar member.

3. A cathode ray television transmitter device for simultaneously generating a plurality of distinct video signals comprising means for forming an electron beam, means comprising a first substantially planar member having an aperture therein for passing at least a portion of said beam, means comprising a second substantially planar member having an aperture smaller than the aperture of said first planar member for passing a portion of the beam passed by said first member and for deflecting the remainder, said second planar member being positioned parallel to and more remote from the beam forming means than said first planar member, the apertures of the two members being coaxial with respect to each other, first multiplying and collecting means for utilizing the deflected electrons to obtain a first video signal, and second multiplying and collecting means for utilizing that portion of the beam which was passed by the smaller aperture to obtain a second distinct video signal simultaneously with said first signal.

4. A cathode ray television transmitter device according to claim 3 wherein the said first multiplying means comprises an annular multiplier.

References Cited in the file of this patent

UNITED STATES PATENTS

| | | |
|---|---|---|
| 2,138,928 | Klemperer | Dec. 6, 1938 |
| 2,213,179 | Iams | Aug. 27, 1940 |
| 2,289,500 | James | July 14, 1942 |
| 2,307,728 | Mertz | Jan. 5, 1943 |
| 2,462,896 | Ransom | Mar. 1, 1949 |
| 2,506,742 | Rose | May 9, 1950 |
| 2,563,482 | Nelson | Aug. 7, 1951 |